I. D. MITCHELL.
DRAFT EQUALIZER.
APPLICATION FILED JUNE 23, 1921.

1,425,407.

Patented Aug. 8, 1922.

Witness
James F. FitzGibbon

Inventor
Ervie D Mitchell
By Chandler & Chandler
Attorneys

UNITED STATES PATENT OFFICE.

IRVIE D. MITCHELL, OF ROSS, IOWA.

DRAFT EQUALIZER.

1,425,407.   Specification of Letters Patent.   Patented Aug. 8, 1922.

Application filed June 23, 1921. Serial No. 479,907.

*To all whom it may concern:*

Be it known that I, IRVIE D. MITCHELL, a citizen of the United States, residing at Ross, in the county of Audubon, State of Iowa, have invented certain new and useful Improvements in Draft Equalizers; and I do hereby declare the following to be a full, clear, and exact description of the invention, such as will enable others skilled in the art to which it appertains to make and use the same.

This invention relates to new and useful improvements in draft devices for plows or other agricultural implements, and particularly to draft equalizers therefor.

One object of the invention is to provide a device of this character wherein the draft can be readily equalized when four, five, or six horses are used, the leading team being preferably a distance in advance of the other team.

Another object is to provide a device of this character wherein the draft can be quickly and easily adjusted for different conditions and for different numbers of draft animals.

Other objects and advantages will be apparent from the following description when taken in connection with the accompanying drawing.

Figure 1:
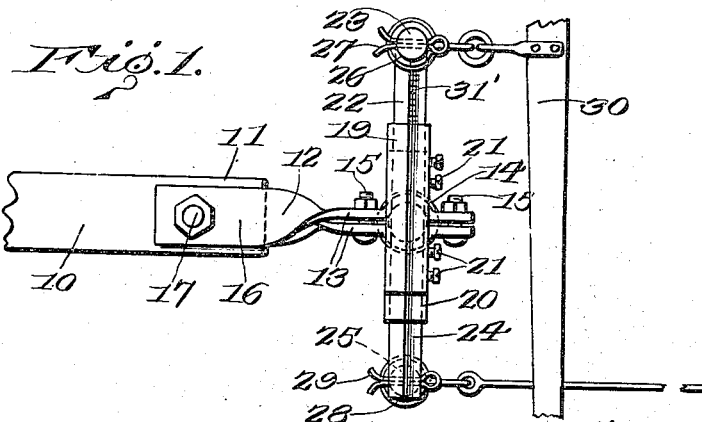
Figure 1 is a top plan view of the draft equalizer.
Figure 2:
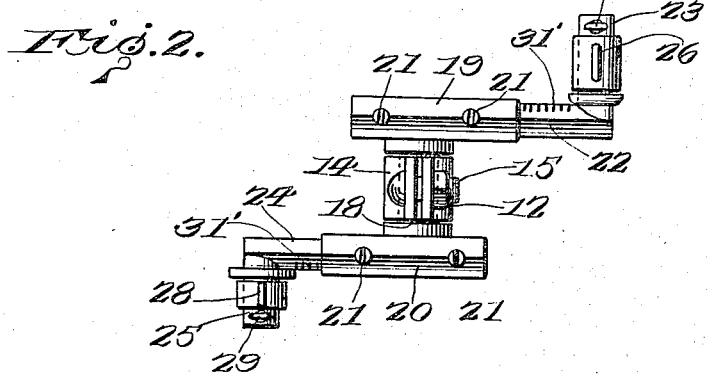
Figure 2 is a front elevation of the same.
Figure 3:
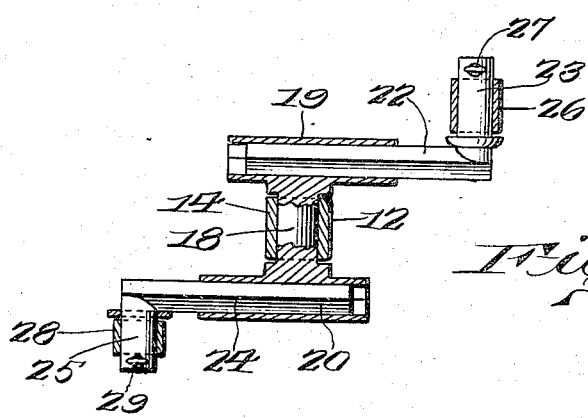
Figure 3 is an enlarged vertical sectional view through the pivoted member of the equalizer, on the line 3—3 of Figure 1, which line extends longitudinally of the draft arms.

Referring particularly to the accompanying drawing, 10 represents a portion of the beam of a plow having the clevis attaching head 11. A clevis, designated as a whole by the numeral 12, consists of the flat metal plates 13 which are outwardly bowed at 14, for a purpose which will appear later herein, and provided with the clamping bolts 15 therethrough, and at one end. The plates 13, adjacent their other ends, are twisted into a plane at right angles to the plane of the first portions and the outer portions thereof are formed with the angular terminal portions 16 and the bolt 17, for attachment to the head 11 of the beam 10.

Rotatably supported within the bowed portions 14 of the clevis is a vertical shaft 18, the upper end of which is formed with a laterally extending horizontal tube 19, which is rectangular in cross section, while the lower end is formed with a similar tube 20 extending laterally and horizontally therefrom, but in the opposite direction to that of the first tube. Carried by each of the tubes are the retaining screws 21. Slidable in the upper tube 19, and extending outwardly from the end thereof, is an angular shaft 22 having its end turned upwardly at right angles, as shown at 23. Similarly disposed in the lower tube 20, but extending laterally in the opposite direction to that of the shaft 22, is a shaft 24, having the arm 25 extending at right angles therefrom, but downwardly. A draft link 26 is pivotally supported on the upper arm 23 and retained by the cross key 27, while a similar draft link 28 is engaged on the lower arm 25 and retained by the key 29. Connected to the draft link 28 is the evener bar 31 for the leading team, while an evener bar 30 is connected to the other draft link 26. Each of the shafts 22 and 24 is formed with graduations 31 whereby accurate adjustment of the shafts can be made slidably inward and outward of the tubes, to regulate the leverage of the draft.

When four horses are used two are hitched to the evener bar 30 and two to the doubletree 31. When six horses are used three are placed in front and three at the rear, while when five horses are used, two are hitched to the front doubletree 30 and three to the rear one 31.

By moving one of the shafts 22 or 24 inwardly and the outer outwardly, different leverages can be obtained, whereby the draft of the leading and rear teams will be equalized.

The evener bar 30 is shown as broken off at both ends in Figure 1, but it is the intention of the invention to have the lower or right hand end of said bar extend transversely of the rod which leads rearwardly from the bar 31, so that the animal which is hitched to said right end of the bar 30 will travel directly at the rear of the animal which is hitched to the right hand end of the bar 31.

What is claimed is:

A draft equalizer comprising a clevis, a vertical shaft rotatably supported in the clevis, the upper and lower ends of the shaft having horizontal and oppositely extending tubes, a shaft slidable in each tube and having a right angularly extending terminal arm, the arm of one shaft extending upwardly while the arm of the other shaft extends downwardly, and means on the said arms for connection with draft animals.

In testimony whereof, I affix my signature, in the presence of two witnesses.

IRVIE D. MITCHELL.

Witnesses:
 REED McMURRAY,
 LEO SCHUELLER.